(12) United States Patent
Marshall et al.

(10) Patent No.: US 9,822,229 B2
(45) Date of Patent: Nov. 21, 2017

(54) LOW EMISSIVITY FILM

(75) Inventors: Colin Marshall, Wigton (GB); Paul Watters, Wigton (GB)

(73) Assignee: INNOVIA FILMS LIMITED, Wigton, Cumbria (GB)

( * ) Notice: Subject to any disclaimer, the term of this patent is extended or adjusted under 35 U.S.C. 154(b) by 713 days.

(21) Appl. No.: 12/601,246

(22) PCT Filed: May 21, 2008

(86) PCT No.: PCT/GB2008/050369
§ 371 (c)(1),
(2), (4) Date: Mar. 15, 2010

(87) PCT Pub. No.: WO2008/142453
PCT Pub. Date: Nov. 27, 2008

(65) Prior Publication Data
US 2010/0173145 A1    Jul. 8, 2010

(30) Foreign Application Priority Data

May 24, 2007 (GB) .................................. 0709974.0
Dec. 13, 2007 (GB) .................................. 0724313.2
Apr. 18, 2008 (GB) .................................. 0807108.6

(51) Int. Cl.
C08J 7/04        (2006.01)
C09D 5/38        (2006.01)
C09D 7/12        (2006.01)
C08K 3/08        (2006.01)

(52) U.S. Cl.
CPC ............... *C08J 7/047* (2013.01); *C09D 5/38* (2013.01); *C09D 7/1291* (2013.01); *C08J 2475/00* (2013.01); *C08K 3/08* (2013.01); *Y10T 428/249978* (2015.04); *Y10T 428/25* (2015.01); *Y10T 428/273* (2015.01); *Y10T 428/31544* (2015.04); *Y10T 428/31609* (2015.04); *Y10T 428/31678* (2015.04)

(58) Field of Classification Search
None
See application file for complete search history.

(56) References Cited

U.S. PATENT DOCUMENTS

| | | | |
|---|---|---|---|
| 395,243 A | 12/1888 | Maggi | |
| 751,047 A | 2/1904 | Bircher | |
| 2,605,897 A | 8/1952 | Rundle | |
| 2,752,037 A | 6/1956 | Vogt | |
| 3,047,140 A | 7/1962 | Robins | |
| 3,234,038 A * | 2/1966 | Stephens et al. | 428/328 |
| 3,770,122 A | 11/1973 | Thiele | |
| D242,465 S | 11/1976 | Heldecker | |
| 4,011,190 A | 3/1977 | Telkes | |
| 4,157,784 A | 6/1979 | Grottup et al. | |
| D266,224 S | 9/1982 | Bronander, Jr. | |
| 4,426,465 A | 1/1984 | Maki et al. | |
| D276,566 S | 11/1984 | Yoshizawa | |
| D276,567 S | 11/1984 | Yoshizawa | |
| 4,565,738 A | 1/1986 | Purdy | |
| 4,720,423 A | 1/1988 | Fraser | |
| 4,836,438 A | 6/1989 | Rigby | |
| 4,927,180 A | 5/1990 | Trundle et al. | |
| 4,972,948 A | 11/1990 | Saiki et al. | |
| 5,037,870 A | 8/1991 | Gugumus | |
| 5,048,687 A | 9/1991 | Suzuki | |
| 5,154,284 A | 10/1992 | Starkey | |
| 5,174,492 A | 12/1992 | Gero | |
| 5,180,762 A | 1/1993 | Canova | |
| D339,063 S | 9/1993 | Simon | |
| 5,249,676 A | 10/1993 | Ashcraft et al. | |
| 5,358,792 A | 10/1994 | Mehta et al. | |
| 5,443,915 A | 8/1995 | Wilkie et al. | |
| 5,482,571 A | 1/1996 | Yamada | |
| 5,482,780 A | 1/1996 | Wilkie et al. | |
| 5,500,265 A | 3/1996 | Ambroise et al. | |
| 5,643,676 A | 7/1997 | Dobashi et al. | |
| 5,716,698 A | 2/1998 | Schreck et al. | |
| 5,730,354 A | 3/1998 | O'Conner | |
| 5,773,136 A | 6/1998 | Alder et al. | |
| 5,807,625 A | 9/1998 | Amon et al. | |

(Continued)

FOREIGN PATENT DOCUMENTS

DE   A-296 22 554    7/1997
EP   0099335 A1      1/1984

(Continued)

OTHER PUBLICATIONS

International Search Report and Written Opinion in PCT Application No. PCT/GB2008/050369 (the PCT counterpart of the application herewith) dated Sep. 4, 2008 in 10 pages.
U.S. Appl. No. 12/670,356, filed Jan. 22, 2010, Denecker.
U.S. Appl. No. 12/670,374, filed Jan. 22, 2010, Waning et al.
International Search Report for Application No. GB0708692.9 dated Oct. 23, 2007.
International Search Report for Application No. GB0709974.0 dated Oct. 16, 2007.
International Preliminary Report on Patentability in PCT Application No. PCT/GB2008/050320 dated Nov. 19, 2009 in 7 pages.
International Preliminary Report on Patentability in PCT Application No. PCT/GB2008/050595 dated Feb. 4, 2010 in 8 pages.
International Preliminary Report on Patentability in PCT Application No. PCT/GB2008/050596 dated Feb. 4, 2010 in 8 pages.

(Continued)

*Primary Examiner* — Chinessa Golden
(74) *Attorney, Agent, or Firm* — Knobbe, Martens, Olson & Bear LLP

(57) ABSTRACT

The present invention concerns a functional film material comprising a substrate layer and a coating layer, the coating layer comprising a block copolymeric binder and a particulate metal pigment therein, the ratio of pigment to binder in the coating layer being selected with reference to the coat weight to provide the functional film material with an emissivity of less than 0.5, and the substrate and coating layer being selected to provide the film with a VWTR (ambient) in excess 400 $gm^{-2}$ $d^{-1}$ $bar^{-1}$.

19 Claims, No Drawings

(56) References Cited

U.S. PATENT DOCUMENTS

| | | | |
|---|---|---|---|
| 5,924,571 | A | 7/1999 | Cornelissen |
| 5,948,836 | A | 9/1999 | Bonora |
| D427,369 | S | 6/2000 | Bowen et al. |
| 6,117,438 | A | 9/2000 | Topolkaraev et al. |
| 6,168,075 | B1 | 1/2001 | Sagel |
| 6,223,895 | B1 | 5/2001 | Bowen et al. |
| 6,231,975 | B1 | 5/2001 | Kong et al. |
| 6,244,017 | B1 | 6/2001 | Focke et al. |
| 6,248,442 | B1 | 6/2001 | Kong et al. |
| D453,681 | S | 2/2002 | Kursner |
| 6,451,426 | B2 | 9/2002 | Kong et al. |
| 6,491,161 | B1 | 12/2002 | Focke et al. |
| 6,511,728 | B1 | 1/2003 | Bakos et al. |
| D491,313 | S | 6/2004 | Schrott |
| 6,773,797 | B1 | 8/2004 | Wang et al. |
| 6,815,482 | B1 | 11/2004 | Hirn et al. |
| 6,916,867 | B2 | 7/2005 | Gugumus |
| D541,471 | S | 4/2007 | Mitten et al. |
| 7,207,155 | B2 | 4/2007 | Draghetti et al. |
| D561,933 | S | 2/2008 | Mitten et al. |
| 7,377,384 | B2 | 5/2008 | Mitten et al. |
| D592,525 | S | 5/2009 | Maude et al. |
| D592,526 | S | 5/2009 | Maude et al. |
| D594,742 | S | 6/2009 | Meier et al. |
| D601,435 | S | 10/2009 | Fell et al. |
| D613,182 | S | 4/2010 | Fell et al. |
| D619,477 | S | 7/2010 | Frizell et al. |
| 8,088,848 | B2 | 1/2012 | Denecker |
| 8,664,307 | B2 | 3/2014 | Denecker |
| 8,906,987 | B2 | 12/2014 | Denecker |
| 9,079,374 | B2 | 7/2015 | Hewitt et al. |
| 2001/0031371 | A1 | 10/2001 | Kong et al. |
| 2003/0047469 | A1 | 3/2003 | Draghetti et al. |
| 2003/0134159 | A1 | 7/2003 | Peet |
| 2003/0171464 | A1* | 9/2003 | Corzani et al. ............... 524/115 |
| 2003/0203231 | A1 | 10/2003 | Stopper et al. |
| 2003/0226978 | A1 | 12/2003 | Ribi et al. |
| 2004/0115457 | A1 | 6/2004 | Kong |
| 2004/0115458 | A1 | 6/2004 | Kong |
| 2004/0166323 | A1 | 8/2004 | Wang |
| 2005/0014431 | A1* | 1/2005 | Carmody et al. ............... 442/76 |
| 2005/0050851 | A1 | 3/2005 | Osgood |
| 2005/0150786 | A1 | 7/2005 | Mitten et al. |
| 2005/0197481 | A1* | 9/2005 | Temple et al. ................. 528/83 |
| 2005/0230960 | A1 | 10/2005 | Bilodeau |
| 2006/0023327 | A1 | 2/2006 | Coombs et al. |
| 2006/0040091 | A1* | 2/2006 | Bletsos et al. ............... 428/137 |
| 2006/0166023 | A1 | 7/2006 | Yoshikata et al. |
| 2006/0278543 | A1 | 12/2006 | Pham |
| 2007/0037465 | A1* | 2/2007 | Nutz et al. ................... 442/376 |
| 2007/0221526 | A1 | 9/2007 | Kikuchi |
| 2007/0228040 | A1 | 10/2007 | Boriani et al. |
| 2007/0241002 | A1 | 10/2007 | Wu et al. |
| 2010/0155292 | A1 | 6/2010 | Fell et al. |
| 2010/0189938 | A1 | 7/2010 | Hewitt et al. |
| 2010/0237603 | A1 | 9/2010 | Waning et al. |
| 2010/0247898 | A1 | 9/2010 | Denecker |
| 2012/0318703 | A1 | 12/2012 | Fell et al. |
| 2015/0273797 | A1 | 10/2015 | Hewitt et al. |

FOREIGN PATENT DOCUMENTS

| | | | |
|---|---|---|---|
| EP | 0290386 | A2 | 11/1988 |
| EP | 0468923 | A2 | 1/1992 |
| EP | 0746468 | | 4/1996 |
| EP | 1004626 | B1 | 5/2003 |
| EP | 1316419 | A2 | 6/2003 |
| EP | 1413599 | A1 | 4/2004 |
| EP | 1714778 | A1 | 10/2006 |
| EP | 1749655 | | 2/2007 |
| GB | 2236466 | A | 4/1991 |
| GB | 2243578 | A | 11/1991 |
| GB | 2349151 | A | 10/2000 |
| GB | 2354245 | A | 3/2001 |
| JP | 06297630 | A | 10/1994 |
| WO | WO 90/06539 | A | 6/1990 |
| WO | WO 96/04178 | | 2/1996 |
| WO | WO 96/20085 | | 7/1996 |
| WO | WO 98/22291 | | 5/1998 |
| WO | WO 98/29311 | | 7/1998 |
| WO | WO 98/32596 | | 7/1998 |
| WO | WO 00/78545 | | 12/2000 |
| WO | WO 02/100637 | | 12/2002 |
| WO | WO 2003/047857 | | 6/2003 |
| WO | WO 2004/087795 | A1 | 10/2004 |
| WO | WO 2005/072959 | | 8/2005 |
| WO | WO 2007056096 | A2 * | 5/2007 |

OTHER PUBLICATIONS

International Search Report and Written Opinion in PCT Application No. PCT/GB2008/050320 dated Sep. 23, 2009 in 10 pages.
International Search Report and Written Opinion in PCT Application No. PCT/GB2008/050595 dated Nov. 27, 2008 in 12 pages.
International Search Report and Written Opinion in PCT Application No. PCT/GB2008/050596 dated Jan. 28, 2009 in 12 pages.
Search Report in GB 0714418.1 dated Oct. 31, 2007 in 1 page.
Search Report in GB 0714419.9 dated Oct. 5, 2007 in 2 pages.
International Preliminary Report on Patentability in PCT Application No. PCT/GB2008/050369 (the PCT counterpart of this application) dated Dec. 3, 2009 in 7 pages.
U.S. Appl. No. 12/352,478, filed Jan. 12, 2009, Fell et al.
U.S. Appl. No. 29/333,756, filed Mar. 13, 2009, Fell et al.
U.S. Appl. No. 29/333,763, filed Mar. 13, 2009, Frizell et al.
U.S. Appl. No. 12/598,761, filed Nov. 3, 2009, Hewitt et al.
International Preliminary Report on Patentability Date of Mailing Jun. 30, 2011, PCT/GB2009/051712, International Filing date Dec. 14, 2009 in 6 pages.
U.S. Appl. No. 29/333,763, filed Mar. 13, 2009, Transparent Outer Wrapper For Packaging of CDS/DVDS (U.S. Pat. No. DES619477).
U.S. Appl. No. 29/333,750, filed Mar. 13, 2009, Cigarette Packet (U.S. Pat. No. DES601435).
U.S. Appl. No. 29/333,756, filed Mar. 13, 2009, Packaging for Cigarette Packs, Boxed Articles or Playing Cards (U.S. Pat. No. DES613182).
U.S. Appl. No. 12/598,761, filed Nov. 3, 2009, Sealable, Peelable Film.
U.S. Appl. No. 12/670,356, filed Jan. 22, 2010, UV Barrier Film.
U.S. Appl. No. 12/670,374, filed Jan. 22, 2010, Indicia Means.
U.S. Appl. No. 29/305,204, filed Mar. 14, 2008, Cigarette Package Wrapper (U.S. Pat. No. DES592525).
U.S. Appl. No. 29/305,223, filed Mar. 14, 2008, Cigarette Package Wrapper (U.S. Pat. No. DES592526).
U.S. Appl. No. 29/352,478, filed Jan. 12, 2009, Naked Collation Package.

* cited by examiner

LOW EMISSIVITY FILM

This application is a U.S. National Phase under 35 U.S.C. §371 of International Application No. PCT/GB2008/050369, filed on May 21, 2008 and published in English on Nov. 27, 2008, which claims foreign priority from GB 0807108.6, filed on Apr. 18, 2008, GB 0724313.2, filed on Dec. 13, 2007, and GB 0709974.0, filed on May 24, 2007, each of which are incorporated herein by reference in their entirety.

The present invention relates to a low emissivity film.

Emissivity is a relative measure of the amount of energy radiated by an object. A true black body (in the theoretical physical sense) would have an emissivity ($\epsilon$) of 1 whereas a real object has an emissivity of between 0 and 1. An object having low emissivity will emit relatively little of the radiation incident upon it. An object having higher emissivity will emit more of such incident radiation.

This invention is concerned with objects which have relatively low emissivity, and particularly with films having this property, which may then be used as insulating films.

U.S. Pat. No. 6,773,797 discloses breathable, porous films and articles made therefrom and a process for making such films.

EP-A-1316419 discloses weatherable multilayer articles comprising a coating layer comprising a block copolyester-carbonate, a second layer comprising a polymer containing carbonate structural units, an adhesive layer, and a substrate layer. Similar disclosures are made in WO-A-2005/072959 and in US-A-2004/0166323.

EP-A-0099335 discloses a method of providing on a substrate a protected binder layer containing particles of size 10 µm or less.

WO-A-03/047857 discloses multilayer articles comprising a coating layer comprising resorcinol arylate chain members bound to a support substrate via an optional intermediate tie layer.

According to the present invention there is provided a functional film material comprising a substrate layer and a coating layer, the coating layer comprising a block copolymeric binder and a particulate metal pigment therein, the ratio of pigment to binder in the coating layer being selected with reference to the coat weight to provide the functional film material with an emissivity of less than 0.5, and the substrate and the coating layer being selected to provide the film with a water vapor transmission rate WVTR (ambient) in excess of 200 $gm^{-2}$ $d^{-1}$ $bar^{-1}$.

The films of the invention have the capability to provide an insulating regime (particularly with regard to heat) by virtue of their low emissivity, but are also able to transmit moisture to a relatively high degree.

The substrate layer may comprise any one or more of the following: polymeric materials: synthetic paper, films made from organic polymers, preferably biopolymers, more preferably films made from one or more suitable carbohydrates; polysaccharides (such as starch, cellulose, glycogen, hemicellulose, chitin, fructan inulin; lignin and/or pectic substances); gums; proteins, optionally cereal, vegetable and/or animal proteins (such as gluten [e.g. from wheat], whey protein, and/or gelatin); colloids (such as hydro-colloids, for example natural hydrocolloids, e.g. gums); polylactic, polygalactic and/or cellulosic films (e.g. microbial and/or regenerated cellulose film)]; thermoplastic films; polymeric films (for example films comprising: polyolefins [e.g. polypropylene and/or polyethylene] polyurethanes, polyvinylhalides [e.g. PVC], polyesters [e.g. polyethylene terephthalate—PET], polyamides [e.g. nylons] and/or non-hydrocarbon polymers); and/or multilayer and/or composite sheets formed by any suitable combinations and/or mixtures of thereof. The substrate may also be paper.

Substrate layers of films of the invention may be in the form of monolayers, or may comprise two or more layers which can be formed by coextrusion and/or by laminating.

Preferred substrate materials have a WVTR (ambient) in excess of 400 $gm^{-2}$ $d^{-1}$ $bar^{-1}$.

Preferred substrate materials have an oxygen permeability (OTR) (which may be measured for example in standard test ASTM D 3985 at 23° C. and 0 to 5% RH) of less than about 30 $cm^3$ $m^{-2}$ $d^{-1}$ $bar^{-1}$, preferably less than about 25 $cm^3$ $m^{-2}$ $d^{-1}$ $bar^{-1}$, more preferably less than about 20 $cm^3$ $m^{-2}$ $d^{-1}$ $bar^{-1}$, and most preferably less than about 10 $cm^3$ $m^{-2}$ $d^{-1}$ $bar^{-1}$. A relatively low OTR may contribute towards low emissivity of the film.

Particularly preferred substrate materials include cellulose and derivatives thereof (including cellulose acetate), regenerated cellulose (Cellophane™, cuprammonium cellulose), benzoylated cellulose, collagen, polyurethanes and polytetrafluroethylene (Goretex™).

One especially preferred material for the substrate is regenerated cellulose. The substrate may be produced by one or several known manufacturing methods, such as xanthate, cuprammonium, carbamate or organic solvent (e.g. NMMO) processes when a regenerated cellulose material is used.

Another preferred material is cellulose acetate.

Preferably, the substrate is a semi-permeable membrane.

In the event that the substrate is not a semi-permeable membrane then preferably the substrate is microporous.

Preferably at least one of the substrate and the coating is a semi-permeable membrane. In the event that only one of the substrate and the coating is semi-permeable membrane then preferably the other, non-semi-permeable membrane, is microporous.

The coating layer may be formed as a coating in the traditional sense, from a solvent or water based dispersion or solution, or even from a solvent-less system in some cases, or may be an extrusion coating. The coating layer may be applied directly on the substrate, or there may be provided one or more intervening layers. The substrate may be primed or otherwise treated to aid adherence of the coating layer thereon.

The coating layer can be composed of cellulose derivatives (e.g. ethers, esters, nitrocellulose, etc.), synthetic organic polymers (e.g. polyacrylic ester, polyvinyl acetate copolymers, polyurethanes, aliphatic polyamides such as nylon 6, nylon 6.6, nylon 4.6, polysulfone and polyethersulfone and the like), modified or unmodified naturally occurring polymers (e.g. starches, proteins, etc.). Mixtures of these with or without the addition of inorganic additives (e.g. fumed silica) can also be used. However, it is generally preferred that such inorganic additives be substantially absent from the coating layer since such additives tend to increase the emissivity of the film.

The block copolymeric binder is preferably selected from materials comprising a hard and soft segment polymer of the type designated for fabrics allowing breathability. Particularly preferred examples include styrene butadiene styrene resins and hydrophilic polyurethanes. Hydrophilic polyurethanes which may be used according to the invention as preferred material for the binder are the reaction product of (a) polyisocyanates; and (b) polyols containing at least two isocyanate reactive groups; and (c) optionally an active hydrogen-containing chain extender.

Suitable polyisocyanates comprise aliphatic, cycloaliphatic, or aromatic polyisocyanates. As examples of suitable aliphatic diisocyanates, there may be mentioned 1,4-diisocyanatobutane, 1,6-diisocyanatohexane, 1,6-diisocyanato-2,2,4-trimethylhexane and 1,1,2-diisocyanatododecane, either alone or in admixture. Particularly suitable cycloaliphatic diisocyanates include 1,3- and 1,4-diisocyanatocyclohexane, 2,4-diisocyanato-1-methylcyclohexane, 1,3-diisocyanato-2-methylcyclohexane, 1-isocyanato-2-(isocyanatomethyl)cyclopentane, 1,1'-methylenebis[4-isocyanatocyclohexane, 1,1-(1-methylethylidene) bis (4-isocyanatocyclohexanej, 5-isocyanato-1-isocyanatomethyl-1,3,3-trimethylcyclohexane (isophorone diisocyanate), 1,3- and 1,4bis(isocyanatomethyl)cyclohexane, 1,1-methylenebis[4-isocyanato-3-methylcyclohexane, 1-isocyanato-4(or 3)-isocvanatomethyl-1-methylcyclohexane, either alone or in admixture.

Particularly suitable aromatic diisocyanates include 1,4-diisocyanatobenzene, 1,1'-methylenebis[4-isocyanatobenzene], 2,4-diisocyanato-1-methylbenzene, 1,3-diisocyanato-2-methylbenzene, 1,5-diisocyanatonaphthalene, 1,1-(1-methylethylidene)bis[4-isocyanatobenzene, 1,3- and 1,4-bis (1-isocyanato-1-methylethyl)benzene, either alone or in admixture. Aromatic polyisocyanates containing 3 or more isocyanate groups may also be used such as 1,1',1"-methylidynetris[4-isocyanatobenzene] and polyphenyl polymethylene polyisocyanates obtained by phosgenation of aniline/formaldehyde condensates.

The polyols containing at least two isocyanate reactive groups may be polyester polyols, polyether polyols, polycarbonate polyols, polyacetal polyols, polyesteramide polyols or polythioether polyols. The polyester polyols, polyether polyols and polycarbonate polyols are preferred.

Suitable polyester polyols which may be used include the hydroxyl-terminated reaction products of polyhydric, preferably dihydric alcohols (to which trihydric alcohols may be added) with polycarboxylic, preferably dicarboxylic acids or their corresponding carboxylic acid anhydrides. Polyester polyols obtained by the ring opening polymerization of lactones such as e-caprolactone may also be included.

The polycarboxylic acids which may be used for the formation of these polyester polyols may be aliphatic, cycloaliphatic, aromatic and/or heterocyclic and they may be substituted (e.g. by halogen atoms) and saturated or unsaturated. As examples of aliphatic dicarboxylic acids, there may be mentioned, succinic acid, glutaric acid, adipic acid, suberic acid, azelaic acid, sebacic acid and dodecanedicarboxylic acid. As an example of a cycloaliphatic dicarboxylic acid, there may be mentioned hexahydrophthalic acid. Examples of aromatic dicarboxylic acids include isophthalic acid, terephthalic acid, ortho-phthalic acid, tetrachlorophthalic acids and 1,5-naphthalenedicarboxylic acid. Among the unsaturated aliphatic dicarboxylic acids which may be used, there may be mentioned fumaric acid, maleic acid, itaconic acid, citraconic acid, mesaconic acid and tetrahydrophthalic acid. Examples of tri- and tetracarboxylic acids include trimellitic acid, trimesic acid and pyromellitic acid.

The polyhydric alcohols which may be used for the preparation of the polyester polyols include ethylene glycol, propylene glycol, 1,3-propanediol, 1,3-butanediol, 1,4-butanediol, 1,5pentanediol, 1,6-hexanediol, neopentyl glycol, diethylene glycol, dipropylene glycol, triethylene glycol, tetraethylene glycol, dibutylene glycol, 2-methyl-1,3-pentanedial, 2,2,4-trimethyl-1,3-pentanediol, 1,4-cyclohexanedimethanol, ethylene oxide adducts or propylene oxide adducts of bisphenol A or hydrogenated bisphenol A. Triols or tetraols such as trimethylolethane, trimethylolpropane, glycerine and pentaerythritol may also be used. These polyhydric alcohols are generally used to prepare the polyester polyols by polycondensation with the above mentioned polycarboxylic acids, but according to a particular embodiment they can also be added as such to the reaction mixture.

Suitable polyether polyols include polyethylene glycols, polypropylene glycols and polytetraethylene glycols.

Suitable polycarbonate polyols which may be used include the reaction products of dials such as 1,3-propanediol, 1,4-butanediol, 1,6-hexanediol, diethylene glycol, triethylene glycol or tetraethylene glycol with phosgene, with diarylcarbonates such as diphenylcarbonate or with cyclic carbonates such as ethylene and/or propylene carbonate.

Suitable polyacetal polyols which may be used include those prepared by reacting glycols such as diethyleneglycol with formaldehyde. Suitable polyacetals may also be prepared by polymerizing cyclic acetals.

The active hydrogen-containing chain extender which may optionally be used is suitably an aliphatic, alicyclic, aromatic or heterocyclic primary or secondary polyamine having up to 80, preferably up to 12 carbon atoms, or water. In the latter case, a fully reacted polyurethane polymer is obtained with no residual free isocyanate groups.

Where the chain extension of the polyurethane prepolymer is effected with a polyamine, the total amount of polyamine should be calculated according to the amount of isocyanate groups present in the polyurethane prepolymer in order to obtain a fully reacted polyurethane urea polymer with no residual free isocyanate groups: the polyamine used in this case has an average functionality of 2 to 4, preferably 2 to 3.

The degree of non-linearity of the polyurethane urea polymer is controlled by the functionality of the polyamine used for the chain extension. The desired functionality can be achieved by mixing polyamines with different amine functionalities. For example, a functionality of 2.5 may be achieved by using equimolar mixtures of diamines and triamines.

Examples of such chain extenders useful herein include hydrazine, ethylene diamine, piperazine, diethylene triamine, triethylene tetramine, tetraethylene pentamine, pentaethylene hexamine, N,N,N-tris(2-aminoethyl)amine, N-(2-piperazinoethyl)ethylenediamine, N,N'-bis(2-aminoethyl) piperazine, N,N,N'-tris(2-aminoethyl)ethylenediamine, N—[N-(2-aminoethyl)-2-aminoethyl-N'-(2-aminoethyl)piperazine, N-(2-aminoethyl)-N'-(2piperazinoethyl) ethylene diamine, N,N-bis(2-aminoethyl)-N-(2-piperazinoethyl)amine, N,N-bis(2piperazinoethyl)amine, guanidine, melamine, N-(2-aminoethyl)-1,3-propanediamine, 3,3-diaminobenzidine, 2,4,6-triaminopyrimidine, dipropylenetriamine, tetrapropylenepentamine, tripropylenetetramine, N,N-bis(6-aminohexyl)amine, N,N'-bis(3-aminopropyl)ethyienediamine, 2,4-bis(4'-aminobenzyl)aniline, 1,4-butanediamine, 1,6-hexanediamine, 1,8-octanediamine, 1,10-decanediamine, 2-methylpentamethylenediamine, 1,12-dodecanediamine, isophorone diamine (or 1-amino-3-aminomethyl-3'5,5-trimethyl-cyclohexane), bis(4aminocyclohexyl)methane (or bis (aminocyclohexane-4-yl)methane (and bis(4-amino-3methylcyclohexyl)methane (or bis(amino-2-methylcyclohexane-4-yl)methane, polyethylene imines, polyoxyethylene amines and/or polyoxypropylene amines (e.g. Jeffamines from TEXACO).

The total amount of polyamines should be calculated according to the amount of isocyanate groups present in the polyurethane prepolymer. The ratio of isocyanate groups in the prepolymer to active hydrogen in the chain extender during the chain extension is in the range of from about 1.0:0.7 to about 1.0:1.1, preferably from about 1.0:0.9 to about 1.0:1.02 on an equivalent basis.

Preferably, the polyisocyanate is a diisocyanate and more preferably it is selected from 1,1'methylenebis-[4-isocyanatobenzene] and 1,1'-methylenebis (4-isocyanatocyclohexane]. Preferably the polyol is a polyethylene glycol selected from ethylene glycol, polyethylene glycol, polytetramethylene glycol and the like, eventually in admixture with other polyether polyols.

Even more preferably, the polyethylene glycol has a very low molecular weight (from 300 to 900). This is rather unconventional as usually the polyurethanes incorporate polyethylene glycol with a molecular weight above 2000 in order to achieve the well known properties of the polyurethanes (long soft and hard segments, melting point, strength). Breathability is also known to decrease with the molecular weight of the polyethylene glycol. However, in this embodiment, the low molecular weight of the polyethylene glycol is supposed to be responsible for the amelioration of the flux.

Preferably the chain extender is isophorone diamine (or 1-amino-3-aminomethyl-3,5,5,trimethylcyclohexane) alone or in admixture with hydrazine.

The films of the invention can be of a variety of thicknesses according to the end use requirements of the films which are to be produced. The thickness of the film is preferably from about 20 µm to about 350 µm, more preferably from about 25 µm to about 300 µm, and most preferably from about 30 µm to about 250 µm. Other preferred thickness ranges include from about 10 µm to about 300 µm, from about 14 µm to about 300 µm and from about 17 µm to about 300 µm.

The particulate metal material is preferably a polished metal material, selected for example from aluminium, bronze, stainless steel, brass, gold, nickel, silver, silver coated glass, tin or copper, or mixtures of two or more thereof The particulate metal material preferably has a predominantly lamellar or plate-like form. Preferably the median aspect ratio of the material is at least about 10:1, more preferably at least about 20:1 and most preferably at least about 30:1. The aspect rations of certain specific materials useful in the present invention are given below. These values are given as typical diameter to thickness ratios for metallic flakes of median diameter (d50) c.12 um:—

Miraroto Silver Dollar (thin silver dollar): 120:1

Silver Dollar: 35:1

Mirasheen (VMP): 400:1

Aluminium Cornflake: 60:1

Bronze Cornflake: 45:1

These are approximations only and will vary from manufacturer to manufacturer and on the feed size and milling conditions used to generate the pigment.

Generally speaking, the materials with higher aspect ratios tend to be more expensive, and their selection or otherwise in the films of the invention will depend on the end application of the film and as to whether the selection of a relatively expensive material is justified in the end use.

The particulate metal material when provided in flake form is preferably of a "non-leafing" variety, meaning that the metal particles are not coated with stearic acid or functionally similar material.

The emissivity of the film in accordance with the invention is less than about 0.5, preferably less than about 0.45, more preferably less than about 0.4, still more preferably less than about 0.35 and most preferably less than about 0.3.

In selecting the materials of the film to obtain emissivity within the stated ranges, particular attention must be paid to two aspects in particular:

The ratio in the coating layer of pigment to binder (p:b).

The coat weight on the substrate.

Generally speaking, the higher the p:b ratio, the lower the emissivity of the film because, for a given coat weight, the coating layer has a relatively higher proportion of pigment—in this case metal particle pigment, which is responsible at least in part for reducing the emissivity of the film. However, if the p:b ratio is too high then the integrity of the coating layer can be compromised, and metal particles may disintegrate from the film, being insufficiently bound.

On the other hand, a relatively low p:b ratio can still give rise to a film with acceptably low emissivity, provided that the coat weight is high enough. However, if the coat weight is too high then, as well as adding cost to the film, the WVTR of the film may also be compromised and made unacceptably high.

Preferably the film substrate has a higher WVTR than the coating layer. In this case the determining factor of the WVTR of the film as a whole is the coating layer. The WVTR of the substrate is preferably at least about 10, more preferably at least about 50 and most preferably at least about 100 $gm^{-2}$ $d^{-1}$ $bar^{-1}$ higher than that of the coating layer.

Because of the competing variable contribution made to emissivity by the two variables mentioned above, it is not always possible to define in absolute terms what range of those variables will produce a film in accordance with the invention. A relatively low p:b ratio can be offset by a higher coat weight, and vice versa.

However, in most cases the p:b ratio in the coating layer will be from about 3:1 to about 1:10, preferably from about 2.5:1 to about 1:5, more preferably from about 2.25:1 to about 1:4, and most preferably from about 2:1 to about 1:3.

In most case the coat weight will be from about 0.8 to about 2.5 $gm^{-2}$, preferably from about 0.9 to about 2.4 $gm^{-2}$, more preferably from about 1.0 to about 2.3 $gm^{-2}$ and most preferably from about 1.1 to about 2.2 $gm^{-2}$ Other variables which may affect the emissivity of the film include the nature of the particulate metal and the nature of the binder material.

The films of the invention will now be more particularly described with reference to the following examples.

EXAMPLES

Films in accordance with the invention were prepared (lab and pilot) by coating regenerated cellulose films (thickness of around 35 µm) with a coating comprising a polyurethane binder and a pigment. The coatings were applied by direct gravure coating to produce the films identified in Table 1 and with the properties identified therein. In the plant trials the coatings were applied to a cellulose acetate substrate available from Clarifoil, PO Box 5, Spondon, Derby, UK, DE21 7BP. W

TABLE 1

| Sample Type | Polyurethane | Pigment | Pigment Type | P:B | Coat weight (g/m²) | Emissivity (ctd side) | WVTR* (g/m²/day) |
|---|---|---|---|---|---|---|---|
| Cellophane (comparative) | | | | | | 0.83 | |
| Lab | Cytec XPR571 | Silberline# Starbrite 2100 | Non-Leafing | 0.67:1 | 0.8 | 0.20 | 1282 |
| Lab | Cytec XPR571 | Silberline# Starbrite 2100 | Non-Leafing | 0.67:1 | 0.8 | 0.28 | 1391 |
| Lab | Cytec NPU433 | Silberline# LT20727 | Non-Leafing | 0.4:1 | 1.5 | 0.49 | 1312 |
| Lab | Bayer Impraperm 43189 | Miraroto+ TF4679 | Non-Leafing | 0.4:1 | 1.5 | 0.48 | 1216 |
| Lab | Bayer Impraperm 43189 | Miraroto+ TF4679 | Leafing | 0.4:1 | 0.8 | 0.24 | 1116 |
| Lab | Cytec XPR571 | Miraroto+ TF4679 | Non-Leafing | 1.5:1 | 1.1 | 0.50 | 1449 |
| Lab | Cytec XPR571 | Miraroto+ TF4679 | Non-Leafing | 1.5:1 | 1.4 | 0.44 | 1377 |
| Lab | Cytec XPR571 | Miraroto+ TF4679 | Non-Leafing | 2:1 | 0.85 | 0.50 | 1449 |
| Lab | Cytec XPR571 | Miraroto+ TF4679 | Non-Leafing | 2:1 | 1.1 | 0.45 | 1394 |
| Pilot | Cytec XPR571 | Miraroto+ TF4679 | Non-Leafing | 1:1 | 0.9 | 0.42 | 1444 |
| Pilot | Cytec XPR571 | Miraroto+ TF4679 | Non-Leafing | 1:1 | 2.2 | 0.26 | 1163 |
| Pilot | Cytec XPR571 | Miraroto+ TF4679 | Non-Leafing | 1:1 | 1.7 | 0.30 | 1216 |
| Pilot | Cytec XPR571 | Miraroto+ TF4679 | Non-Leafing | 1.5:1 | 2.2 | 0.24 | 1158 |
| Pilot | Cytec XPR571 | Miraroto+ TF4679 | Non-Leafing | 1.5:1 | 1.7 | 0.21 | 1168 |
| Plant | Cytec XPR571 | RotoVario+ 530925 + Bricosoll− Yellow KRV | Non-Leafing | 1.5:1 | 1.41 | 0.21 | 625 |
| Plant | Cytec XPR571 | Miraroto TF4679 + Bricosoll− Yellow KRV | Non-Leafing | 1.5:1 | 1.57 | 0.22 | 519 |
| Plant | Cytec XPR571 | Miraroto+ TF4679 Bricosoll− Yellow KRV | Non-Leafing | 1.5:1 | 1.16 | 0.19 | 595 |

*measured by the Standard Test Methods for Water Vapor Transmission of Material - ASTM E96/E96M-04
from Silberline Manufacturing Co., Inc., 130 Lincoln Drive, P.O. Box B, Tamaqua, Pennsylvania 18252
^from Cytec Surface Specialties S.A., Anderlechtstraat 33 - Rue d'Anderlecht, 1620 Drogenbos
+from Eckart GmbH & Co. KG, Guentersthal, 91235 Velden, Germany
*from Albion Colours, High Level Way, Halifax, HX1 4PN

The invention claimed is:

1. A functional film material for providing an insulation regime facilitated by low emissivity comprising:
    a substrate layer selected from cellulose acetate, cellulose and derivatives thereof; and
    a coating layer forming the outermost layer of the film, the coating layer comprising:
        a block copolymeric binder, and
        a particulate metal pigment therein,
        a ratio of pigment to binder in the coating layer being selected with reference to a coat weight and to be within a range from 3:1 to 1:10 to provide the functional film material with an emissivity 0.5 or less;
    the substrate and coating layer being selected to provide the film with an ambient water vapor transmission rate (WVTR (ambient)) in excess of 400 gm$^{-2}$ d$^{-1}$ bar$^{-1}$, wherein the WVTR of the substrate is at least 10 gm$^{-2}$ d$^{-1}$ bar$^{-1}$ higher than the coating layer and wherein the substrate layer has a higher WVTR than the coating layer, such that the determining factor of the WVTR of the film as a whole is the coating layer.

2. The functional film material according to claim 1 wherein the substrate layer has a WVTR (ambient) in excess of 400 gm$^{-2}$ d$^{-1}$ bar$^{-1}$.

3. The functional film material according to claim 1 wherein the substrate layer has an oxygen permeability (OTR) of less than about 30 cm$^3$ m$^{-2}$ d$^{-1}$ bar$^{-1}$.

4. The functional film material according to claim 1 wherein the substrate layer is cellulose acetate.

5. The functional film material according to claim 1 wherein the substrate layer is regenerated cellulose.

6. The functional film material according to claim 1 wherein the block copolymeric binder is selected from materials comprising a hard and soft segment polymer of the type configured for fabrics allowing breathability.

7. The functional film material according to claim 6 wherein the block copolymeric binder is selected from hydrophilic polyurethanes.

8. The functional film material according to claim 1 wherein the particulate metal material is a polished metal material.

9. The functional film material according to claim 8 wherein the polished metal material is selected from the group consisting of aluminium, bronze, stainless steel, brass, gold, nickel, silver, silver coated glass, tin, copper, and mixtures of two or more thereof.

10. The functional film material according to claim 1 wherein the particulate metal material has a predominantly lamellar or plate-like form.

11. The functional film material according to claim 10 wherein a median aspect ratio of the particulate metal material is at least about 10:1.

12. The functional film according claim 1 wherein the emissivity of the film is less than about 0.45.

13. The functional film according to claim 12 wherein the emissivity of the film is less than about 0.4.

14. The functional film according to claim 1 wherein the film substrate layer has a WVTR (ambient) in excess of 400 $gm^{-2}$ $d^{-1}$ $bar^{-1}$ and the coating layer is at least one of the group consisting of: a semi-permeable membrane and a microporous layer.

15. The functional film according to claim 1 wherein the coat weight is from about 0.8 to about 2.5 $gm^{-2}$.

16. The functional film material according to claim 15 wherein at least one of the film and the substrate layer has a WVTR (ambient) in excess of 1000 $gm^{-2}$ $d^{-1}$ $bar^{-1}$.

17. The functional film material according to claim 1 wherein at least one of the film and the substrate layer has a WVTR (ambient) in excess of 500 $gm^{-2}$ $d^{-1}$ $bar^{-1}$.

18. The functional film material according to claim 1 wherein at least one of the substrate and the coating is a semi-permeable membrane.

19. The functional film material according to claim 1 wherein at least one of the substrate and the coating is microporous.

* * * * *